United States Patent
Sun

(10) Patent No.: US 9,104,957 B2
(45) Date of Patent: Aug. 11, 2015

(54) IMAGING DEVICE HAVING INFORMATION PROTECTION FUNCTION

(71) Applicant: ZHUHAI SEINE TECHNOLOGY CO., LTD., Zhuhai (CN)

(72) Inventor: Wanli Sun, Zhuhai (CN)

(73) Assignee: ZHUHAI SEINE TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 14/514,346

(22) Filed: Oct. 14, 2014

(65) Prior Publication Data

US 2015/0029531 A1  Jan. 29, 2015

Related U.S. Application Data

(63) Continuation-in-part of application No. PCT/CN2012/085941, filed on Dec. 5, 2012.

(30) Foreign Application Priority Data

Apr. 11, 2012 (CN) .................... 2012 2 0152912 U

(51) Int. Cl.
*G06F 3/12* (2006.01)
*G06K 15/00* (2006.01)
(Continued)

(52) U.S. Cl.
CPC .......... *G06K 15/4045* (2013.01); *G06F 3/1222* (2013.01); *G06F 3/1231* (2013.01);
(Continued)

(58) Field of Classification Search
CPC ......... G06F 3/067; G06F 21/00; G06F 21/30; G06F 21/60; G06F 21/608; G06F 21/72; G06F 3/1293; H04N 21/2181; H04N 21/23439; H04N 21/6587; H04N 1/00464; H04N 1/00127; H04N 1/00217
See application file for complete search history.

(56) References Cited

U.S. PATENT DOCUMENTS 6,754,698 B1 * 6/2004 Philyaw et al. ............... 709/217
6,766,394 B1 * 7/2004 Shimura et al. ............... 710/100
(Continued)

FOREIGN PATENT DOCUMENTS

CN           2155045 Y      2/1994
CN        101852999 A      10/2010
(Continued)

OTHER PUBLICATIONS

Shao, Si-Fei et al., "A design for a printer—sharing multiplexer" Journal of Yanan University, Mar. 2001, vol. 20, No. 1, pp. 39-41, (Abstract on p. 3).

(Continued)

*Primary Examiner* — Negussie Worku
(74) *Attorney, Agent, or Firm* — J.C. Patents

(57) ABSTRACT

Provided is an imaging device having an information protection function, comprising an imaging control unit, an interface control unit, and at least two interfaces, and further comprising a changeover switch unit provided between the interfaces and the interface control unit, configured to change over the physical communication or physical isolation between the interfaces and the interface control unit. The imaging device provided in the solution maintains the physical communication or physical isolation between the interfaces and the interface control unit via the changeover switch unit, reduces the possibility of communicating between the interfaces via the interface control unit, thus avoiding the leakage of user data via the communicated interfaces, and reducing potential network security risk.

20 Claims, 3 Drawing Sheets

(51) Int. Cl.
*G06F 21/60* (2013.01)
*G06F 13/42* (2006.01)

(52) U.S. Cl.
CPC ............ *G06F3/1294* (2013.01); *G06F 3/1297* (2013.01); *G06F 13/42* (2013.01); *G06F 21/608* (2013.01); *G06K 15/4095* (2013.01)

(56) References Cited

U.S. PATENT DOCUMENTS

| | | | |
|---|---|---|---|
| 6,823,388 B1* | 11/2004 | Philyaw et al. | 709/227 |
| 7,095,854 B1* | 8/2006 | Ginter et al. | 380/233 |
| 7,530,113 B2* | 5/2009 | Braun | 726/28 |
| 7,627,696 B2* | 12/2009 | Suematsu et al. | 710/14 |
| 7,676,602 B2* | 3/2010 | Uzun et al. | 709/251 |
| 8,073,898 B2* | 12/2011 | Kikkoji et al. | 709/203 |
| 2002/0009048 A1* | 1/2002 | Hosler et al. | 370/217 |
| 2007/0162825 A1* | 7/2007 | Wang et al. | 714/763 |
| 2009/0271839 A1* | 10/2009 | Kanai et al. | 726/1 |
| 2010/0238489 A1* | 9/2010 | Meyerhofer et al. | 358/1.15 |
| 2011/0066488 A1* | 3/2011 | Ludewig et al. | 705/14.43 |
| 2014/0122651 A1* | 5/2014 | Hsu et al. | 709/218 |
| 2014/0355069 A1* | 12/2014 | Caton et al. | 358/3.28 |

FOREIGN PATENT DOCUMENTS

| | | |
|---|---|---|
| CN | 202523068 U | 11/2012 |
| JP | 63-181026 A | 7/1988 |

OTHER PUBLICATIONS

International Search Report of corresponding International PCT Application No. PCT/CN2012/085941, dated Feb. 6, 2013.

* cited by examiner

IMAGING DEVICE HAVING INFORMATION PROTECTION FUNCTION

CROSS-REFERENCE TO RELATED APPLICATIONS

This application is a continuation-in-part of International Application No. PCT/CN2012/085941, filed on Dec. 5, 2012, which claims the priority benefit of Chinese Patent Application No. 201220152912.7, filed on Apr. 11, 2012. The contents of the above identified applications are incorporated herein by reference in their entireties.

TECHNICAL FIELD

The present invention relates to imaging device structure technology, and particularly to an imaging device having information protection function.

BACKGROUND

As one of the most important equipments in current working environment, imaging device has become an essential equipment for offices or homes. Generally, a plurality of computers share one imaging device such as a printer, a scanner and the like, for resource conservation.

Taking the printer for example, a plurality of computers can use one common printer for imaging usually by means of sharing, that is, a first computer which is connected with the printer provides the printer with property of sharing by setting the device attributes, and based on the sharing mode, a second computer controls the printer via the first computer, thereby to implement printing tasks. However, this operation mode is under the condition that the first computer has to be in a working state, obviously, keeping the first computer in working state just for enabling the second computer to print will lead to energy waste.

To solve the problem above, printer manufacturers have introduced printers with multiple universal serial buses (Universal Serial Bus, USB), which can simultaneously connect to a plurality of computers, of which the specific structure is as illustrated in FIG. 1. In addition to a conventional imaging control unit 10, the imaging device also includes one USB control unit 20 and n USB interfaces 30, where the USB control unit 20 controls the data transmission of each USB interface 30, specifically the USB control unit 20 performs the changeover to control which USB interface 30 transmits data with the imaging control unit 10. N computers (PC) 40 utilizes n USB buses to connect to n USB interfaces 30 of the imaging device respectively, thereby realizing the communication with the imaging control unit 10.

In the foresaid mode, due to the existence of the situation that a plurality of PCs are simultaneously connected to the USB control unit for communication, it is possible to realize communication among multiple PCs via the USB control unit, however the security of user data in the PCs is threatened. Especially when the plurality of PCs belong to different networks, for example, when some PCs belong to a local area network (with requirement of encryption protection) and some belong to a public network, the local area network will be threatened by security risks in the public network, such as hackers filching data, computer virus attacking and destroying data, which will result in data lost, network breakdown, etc. in serious cases.

SUMMARY

The present invention provides an imaging device having information protection function, so as to avoid the data communication between different computers when connecting to the imaging device, thus reducing security risks.

The present invention provides an imaging device having information protection function, including an imaging control unit, an interface control unit and at least two interfaces, and further including:

a changeover switch unit, which is provided between the interfaces and the interface control unit, configured to change over physical communication or physical isolation between the interfaces and the interface control unit.

The imaging device having information protection function as described above, preferably, further includes: a switch trigger unit, which is connected with the changeover switch unit, configured to control changeover actions of the changeover switch unit.

The imaging device having information protection function as described above, preferably, the changeover switch unit is a single-pole-multiple-throw switch, or a semi-conductor switch circuit.

The imaging device having information protection function as described above, preferably, the switch trigger unit is a changeover button.

The imaging device having information protection function as described above, preferably, the switch trigger unit is a trigger circuit including a control input end and a control output end, the control input end is configured to input a control instruction signal, the control output end is connected with the changeover switch unit, the trigger circuit converts the control instruction signal into a control changeover signal and outputs the control changeover signal to the changeover switch unit through the control output end.

The imaging device having information protection function as described above, preferably, the interface is a serial communication bus interface.

The imaging device having information protection function as described above, preferably, further includes a monitoring unit, which is connected between the switch trigger unit and each interface, the monitoring unit specifically includes:

a signal detecting subunit, used to detect the input level signal and the output level signal at each interface;

a changeover trigger subunit, configured to output a control instruction signal to the switch trigger unit according to the interface which has detected the input level signal, so as to trigger the changeover to physically communicate the interface which generates the level signal with the interface control unit.

The imaging device having information protection function as described above, preferably, the monitoring unit further includes:

a priority control subunit, configured to select an interface according to a predetermined priority strategy and inform the changeover trigger subunit of the selected interface, when detecting that the input level signal being generated by at least two interfaces.

The imaging device having information protection function as described above, preferably, the monitoring unit further includes:

a state informing subunit, configured to send a busy state notification or an idle state notification to each interface, according to the output level signal detected at the interface.

The imaging device having information protection function as described above, preferably, the monitoring unit, the changeover switch unit, and/or the switch trigger unit are integrated in the imaging control unit, or independent of the imaging control unit.

The imaging device having information protection function as described above, preferably, further includes:

an interface state indicating unit, configured to indicate a communication state of each interface according to the detected input level signal or output level signal of each interface.

The imaging device having information protection function as described above, preferably: the interface state indicating unit is a light emitting diode, the light emitting diode and/or its color corresponds to the communication state of each interface.

The imaging device having information protection function as described above, preferably, the interface state indicating unit is a display, configured to display the communication state of each interface.

The imaging device having information protection function as described above, preferably, further includes:

a default interface changeover unit, which is connected with the switch trigger unit, configured to output a control instruction signal to the switch trigger unit when a default reset condition is detected, so as to trigger the changeover that physically connecting a preset default interface with the interface control unit.

The imaging device having information protection function as described above, preferably:

the default reset condition is a reboot signal or a sleep waking up signal; or the monitoring unit of the imaging device further includes a timekeeping subunit, configured to time the input level signal detected by the signal detecting subunit and produce the default reset condition when no input level signal is detected within a predetermined timing value range.

The imaging device provided by the present invention maintains the physical communication or physical isolation between the interfaces and the interface control unit via the changeover switch unit, reduces the possibility of communicating between the interfaces via the interface control unit, thus avoiding the leakage of user data via the communicated interfaces, and reducing potential network security risk.

DESCRIPTION OF EMBODIMENTS

Embodiment 1

Figure 1:
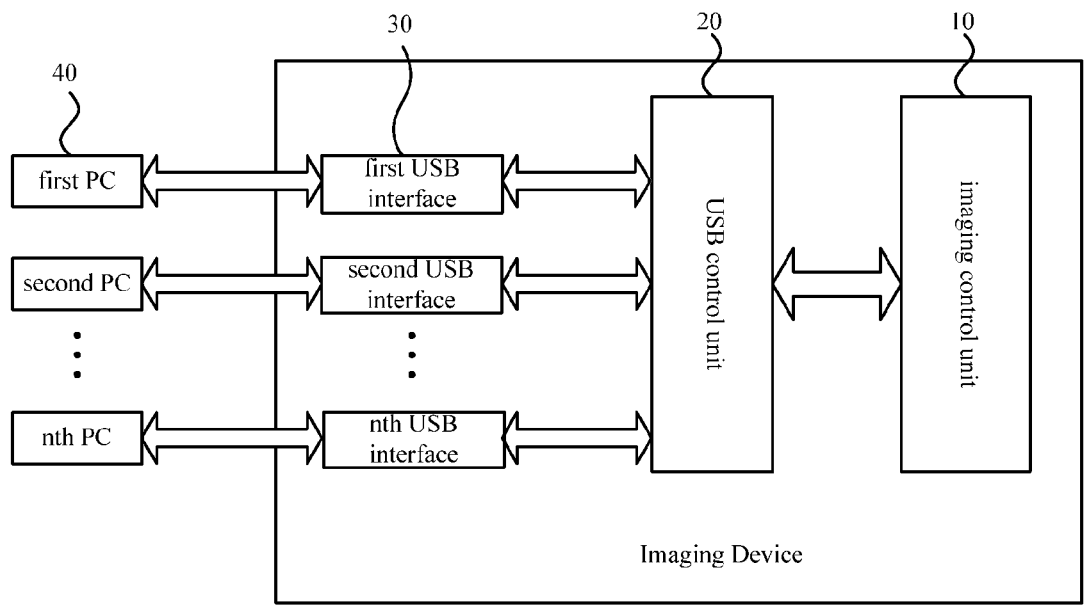
FIG. 1 is a schematic structural view of an imaging device in prior art.
Figure 2:
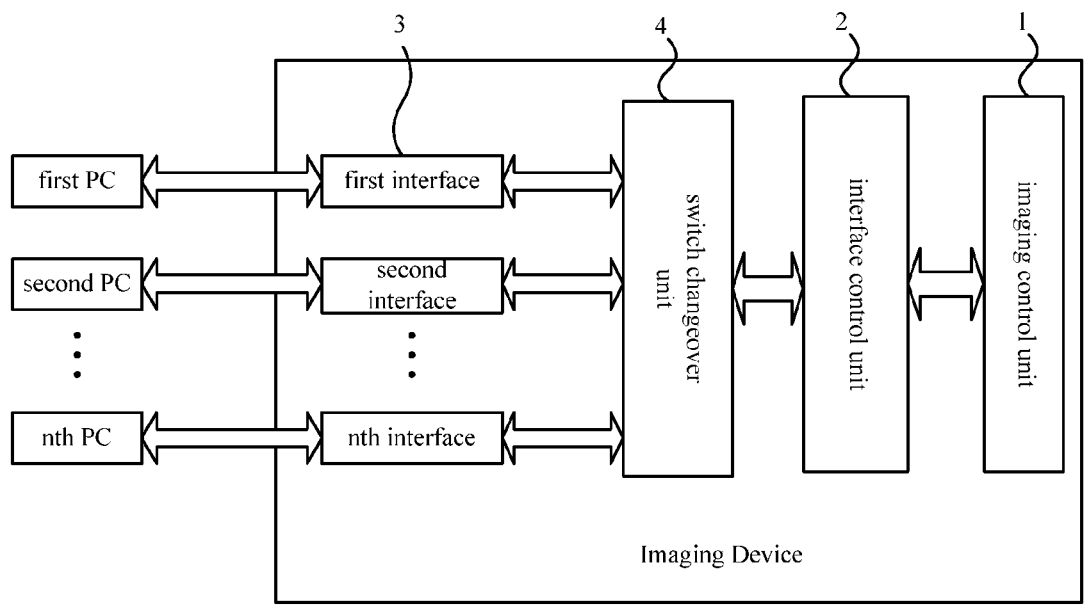
FIG. 2 is a schematic structural view of an imaging device having information protection function according to Embodiment 1 of the present invention.

FIG. 2 is a schematic structural view of an imaging device having information protection function according to Embodiment 1 of the present invention. The imaging device includes an imaging control unit 1, an interface control unit 2 and at least two interfaces 3, and also includes a changeover switch unit 4, which is disposed between the interfaces 3 and the interface control unit 2, configured to change over physical communication or physical isolation between the interfaces 3 and the interface control unit 2.

In the present embodiment, the imaging device can be any type, such as a general printer, scanner and the like, and the imaging control unit 1 is a chip or a circuit which primarily controls imaging in the imaging device, which interacts with computers to transmit data and control imaging. The interface control unit 2 and the interfaces 3 are data transmission interfaces under specific protocols, for example, it is typically a USB interface, and the USB interface control unit can adopt a conventional USB control chip or circuit, used for transmitting data sent by an external device, such as a computer, to the imaging control unit, and for transmitting data sent by the imaging control unit to the external device.

A changeover switch unit is provided in the present embodiment, which can achieve physical communication or physical isolation between the interfaces and the interface control unit. The so-called physical communication or physical isolation refers to whether there is a current signal between the interfaces and the interface control unit. Under the condition of physical isolation, the disconnection of current signal transmission path is implemented between the interfaces and the interface control unit, where the current signal cannot be transmitted. Compared to the technology of changing over interface connectivity in the form of software, the method of physical communication or isolation realizes electrical disconnection, while the software method generally forbids data transmission only in application protocol layer where the circuit still holds connected. Therefore, the technical solution of embodiments of the present invention is capable to ensure no possibility of electrical connection between interfaces by physical isolation, thus avoiding security risk. The changeover switch unit is preferably to make sure that only one designated interface is in physical communication with the interface control unit at a specific time, so as to complete imaging operation. In practical application, it is obvious that users can design the quantity of interfaces which can keep physical communication at the same time, as required.

A mechanical manner or electrical manner can be adopted to implement a changeover switch unit with physical communication or physical isolation. For example, the changeover switch unit can be a mechanical switch, such as a single-pole-double-throw switch, a single-pole-multiple-throw switch, of which the changeover is triggered by mechanical operations, or composed of a plurality of switch components. The circuit switch utilizing electrical manner can specifically select a semi-conductor switch circuit, of which the changeover is triggered by electric signals.

Embodiment 2

Figure 3:
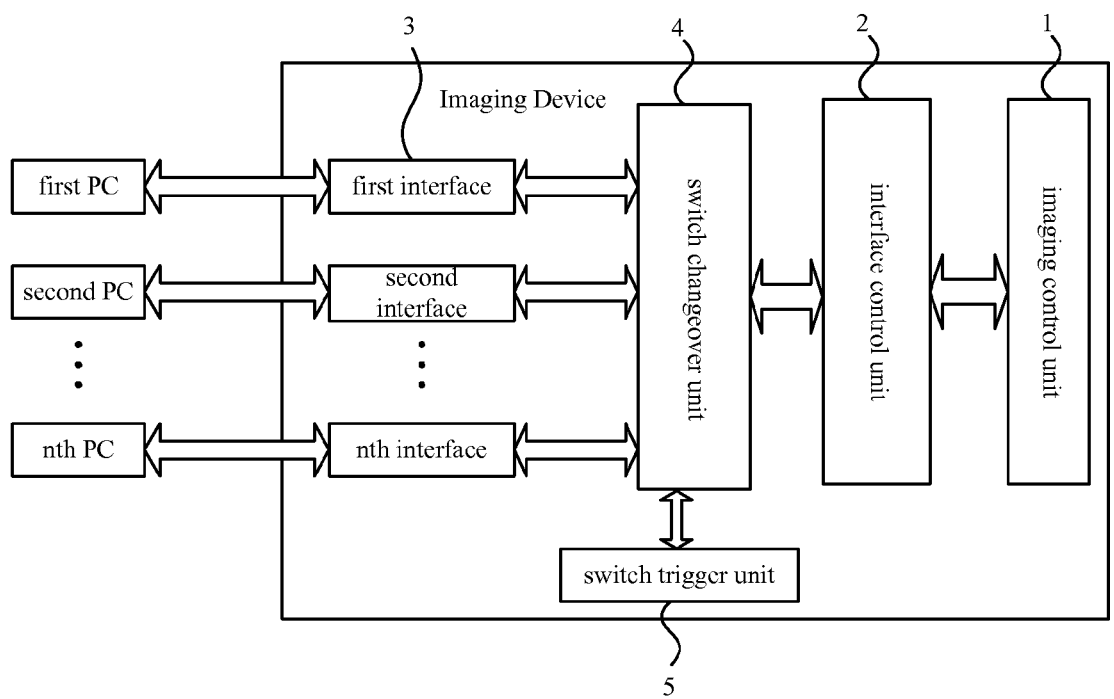
FIG. 3 is a schematic structural view of an imaging device having information protection function according to Embodiment 2 of the present invention.

FIG. 3 is an imaging device having information protection function provided by Embodiment 2 of the present invention. Based on the foresaid embodiment, the present embodiment further includes a switch trigger unit 5, which is connected with the changeover switch unit 4, used to control the changeover actions of the changeover switch unit 4.

For different types of changeover switch unit, the switch trigger unit can utilize different structures. For example, if the changeover switch is a mechanical switch such as a single-pole-multiple-throw switch, the switch trigger unit can be a changeover button which directly controls the changeover control of the switch.

If the changeover switch unit is a semi-conductor switch circuit, the switch trigger unit, preferably, can be a trigger circuit including a control input end and a control output end, where the control input end is used to input a control instruction signal, and the control output end is connected with the changeover switch unit, and the trigger circuit converts the control instruction signal into a control changeover signal and outputs the control changeover signal to the changeover switch unit through the control output end. The trigger circuit can be loaded by a hardware chip, and the control input end can be a chip pin, detecting the level variations caused by the button actions on the operation panel of the imaging device, or the control instruction signals such as the level variations caused by input of the software control panel, or utilizes the control instruction signal input by an external device which communicates with the imaging device, such as a remote controller, a computer etc. The control instruction signal is output from the control output end after being processed by the trigger circuit, and thus controls the changeover switch unit. For example. The transistor of the semi-conductor switch circuit can be controlled to be on or off by high-low level signal.

In an embodiment, the trigger circuit further includes a card read control unit, configured to read card information via the control input end; and the trigger circuit generates a control changeover signal according to the card information and output the control changeover signal to the changeover switch unit through the control output end.

Specifically, the control input end can also be wireless coil, by which the changeover of the switch unit can be controlled by means of swiping card. The trigger circuit can further include a card read control unit, the card read control unit can specifically be a card read chip or the like, then information, such as user information, can be read through the card. The changeover switch unit connects to a corresponding PC according to the relationship between the user information and the PCs, for example, if User 1 corresponds to PC1, that means when the user information read by the card read chip is User 1, then the changeover switch unit connects to PC1. Moreover, the changeover of the switch unit can also be controlled according to the trigger signal acquired through swiping card, so that to connect the changeover switch unit to PCs sequentially or connect the changeover switch unit to a corresponding PC according to predetermined principle, and then perform imaging process according to the imaging job information sent from the corresponding PC. Thereby guaranteeing printing safety, meanwhile the imaging device can record the printing time.

The technical solution of the present embodiment can achieve the control of the imaging device by the user. After an imaging working task is completed, the user can select again to make another gated computer communicate with the imaging control unit; or without selecting, but keep the computer gated before capable to continue communicating with the foresaid imaging control unit.

Embodiment 3

Figure 4:
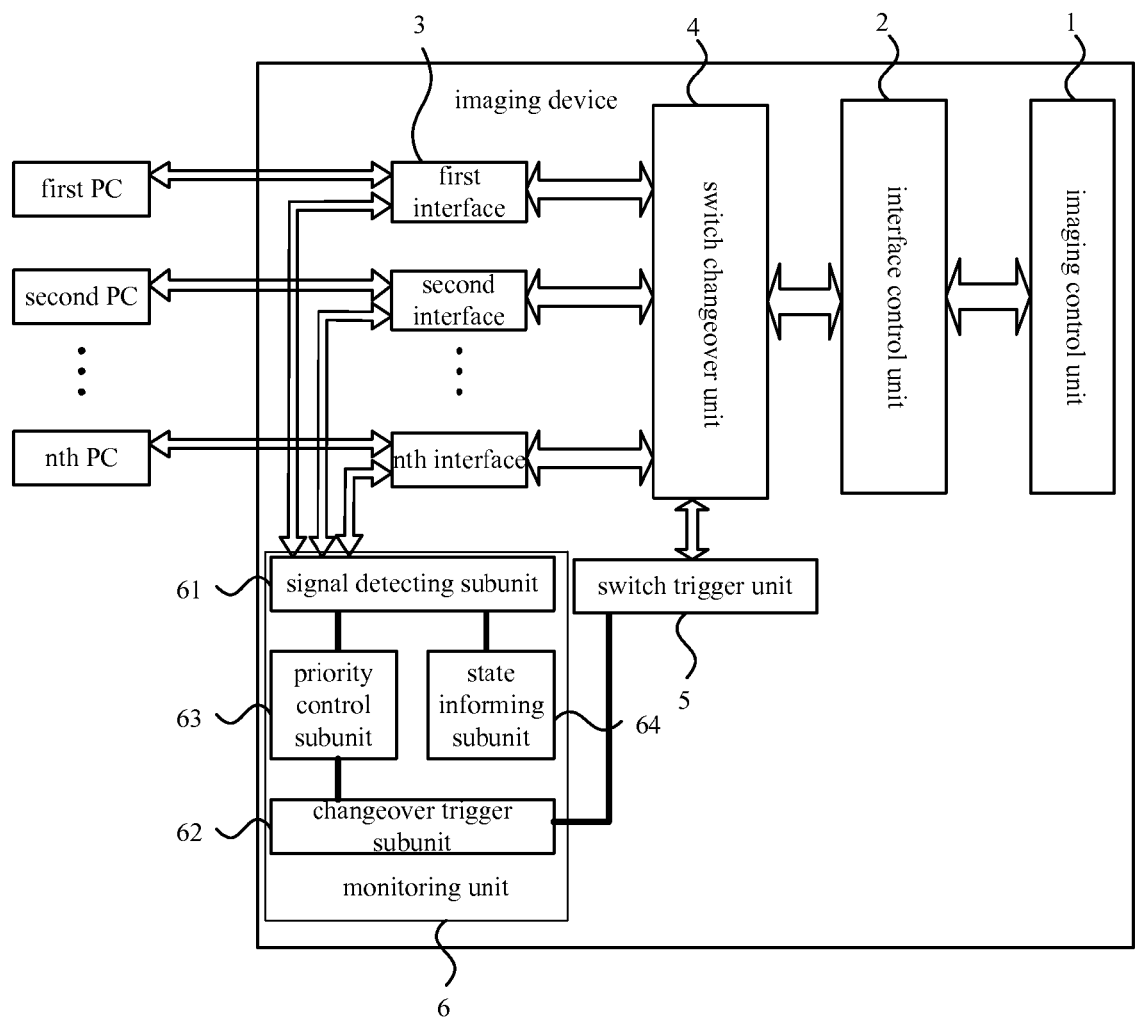
FIG. 4 is a schematic structural view of an imaging device having information protection function according to Embodiment 3 of the present invention.

FIG. 4 is an imaging device having information protection function provided by Embodiment 3 of the present invention. The imaging device further includes a monitoring unit 6 connected between the switch trigger unit 5 and each interface 3, the monitoring unit 6 specifically includes a signal detecting subunit 61 and a changeover trigger subunit 62, in which, the detecting subunit 61 is used for detecting the input level signal and the output level signal at each interface 3, the input level signal is a working level signal input to the interface 3 when a PC is required to perform imaging operations, the output level signal is a working level signal sent out when the interface 3 and the interface control unit 2 are in communication; the changeover trigger subunit 62 is connected with the signal detecting subunit 61, used to output a control instruction signal to the switch trigger unit 5 according to the interface 3 which has detected the input level signal, so as to trigger the changeover to physically communicate the interface 3, which has generated the level signal, with the interface control unit 2.

By means of setting the detecting unit, the imaging device can automatically complete the changeover control of communication or isolation according to the imaging requirement of the user, without manual selection by the user.

Preferably, the monitoring unit 6 also includes: a priority control subunit 63, which is connected with the signal detecting subunit 61, used to select one interface 3 according to a predetermined priority strategy and inform the changeover trigger subunit 62 of the selected interface 3, when detecting that input level signals are generated by at least two interfaces 3. The priority strategy can be configured beforehand in the monitoring unit 6, for example, controlling the sequential order of the interfaces which initiate imaging requests simultaneously according to the order of serial numbers of interfaces 3. The configuration of the priority strategy can be set up by the user via a computer, or via the control panel of the imaging device, and can also be set up by the manufacturer of the imaging device before being released to the market.

The monitoring unit 6 can further include a state informing subunit 64, which is connected with the signal detecting subunit 61, used to send a busy state notification or an idle state notification to each interface 3 according to the output level signal detected at the interfaces, respectively. The technical solution can further inform the user of the current working state of the imaging device.

The functions of the monitoring unit are not limited to the foresaid ones, other functions can also be implemented according to requirements. Function units such as the priority control subunit and the state informing subunit can be arranged separately or in combination. For example, when an input level signal is detected, the monitoring unit can further indentify whether there is another interface which is producing an output level signal, if not, the control instruction signal will be generated, if yes, no control instruction signal will be generated, meanwhile a busy state notification can also be sent and transmitted to the user via a corresponding interface. The busy state notification or idle state notification of the imaging device can be sent in accordance with a set period or after one imaging task is completed, or can be directly sent when a busy state or an idle state is detected.

Preferably, the imaging device having information protection function of the present invention also includes: an interface state indicating unit, used to indicate the communication state of each interface. Specifically, the interface state indicating unit is connected with the signal detecting subunit of the monitoring unit, for indicating the communication state of each interface according to the detected input level signal and output level signal.

The interface state indicating unit can be a light emitting diode (LED), the LED and/or its color corresponds to the communication state of each interface.

For example, the color of the LED can correspond to the communication state of each interface, that is, the communication state of each interface is distinguished by color. If the LED is lighted green, it represents that a first interface is communicated; if the LED is lighted orange, it represents that a second interface is communicated; if the LED is lighted red, it represents a third interface is communicated, and the like. Or there can be provided multiple LEDs, and each LED corresponds to the communication state of one or more interfaces. When each LED exclusively corresponds to one interface, whether the interface is communicated is determined by whether the LED is lighted. If the LED corresponding to the second interface is lighted, it represents that the second interface is communicated. When each LED corresponds to a plurality of interfaces, it can be determined by combining the lighting condition and the color whether these interfaces are communicated or not. If one interface corresponds to the first interface and the second interface, being green represents that the first interface is communicated, and being red represents that the second interface is communicated.

The interface state indicating unit can also be a display, such as a liquid crystal display (LCD) or an organic light emitting diode (OLED) display, used to display the communication state of each interface. For example, characters such as "The second interface is communicated" can be displayed directly on the display.

Preferably, the imaging device having information protection function provided by embodiments of the present invention also includes one default interface changeover unit, which is connected with the switch trigger unit, used to output a control instruction signal to the switch trigger unit when a default reset condition is detected, so as to trigger the changeover to physically connect the preset default interface with the interface control unit.

The default reset condition can be a reboot signal or a sleep waking up signal, etc. Or the monitoring unit of the imaging device also includes a timekeeping subunit, used to time the input level signal detected by the signal detecting subunit and produce the default reset condition when no input level signal is detected within a predetermined timing value range. Thereby the switch trigger unit is controlled to physically connect the default interface with the interface control unit.

The foresaid technical solution, for example, is applicable in situations such as when the printer restarts or is woken up from the sleep state or the detecting unit detects no level signal from any interface in a period of time exceeding a predetermined period, the switch trigger unit is controlled to trigger the changeover switch unit to the default interface, for example, the first interface can be the default interface. The foresaid situations that the printer restarts or is woken up from the sleep state can be determined according to whether the monitoring unit or the switch trigger unit has received a start signal (power up signal) or not.

The default interface above and the predetermined timing value can be preconfigured before the imaging device is released, and also can be set by the user via control devices of the printer such as a printing drive, a display etc.

Of course, in the above situation, under the default reset condition, the switch trigger unit can also conduct no operation, that is, to keep the communication state of the last time.

In the imaging device provided by embodiments of the present invention, the monitoring unit, the changeover switch unit, and/or the switch trigger unit can be integrated in the imaging control unit, or can be provided independent of the imaging control unit. The monitoring unit, the changeover switch unit, and/or the switch trigger unit can be either integrated in one unit, or independently provided respectively.

The imaging device having information protection function provided by the present invention allows an imaging device to be shared by a plurality of computers, while the plurality of computers connected with the imaging device will not communicate with each other, which ensures the security of the user data.

Finally, it should be noted that: the embodiments above are only used to illustrate but not to limit the technical solutions of the present invention. Although detailed description has been made to the present invention with reference to the foresaid embodiments, it should be understood by those skilled in the art that: modifications can still be made to the technical solutions recorded in the foresaid embodiments, or equivalent substitutions can be made to part or all of the technical features; and these modifications or substitutions will not make the essence of the corresponding technical solutions depart from the scope of the technical solutions of embodiments of the present invention.

What is claimed is:

1. An imaging device having information protection function, comprising an imaging control unit, an interface control unit and at least two interfaces, and further comprising:
   a changeover switch unit, which is connected with the interfaces and the interface control unit respectively, is provided between the interfaces and the interface control unit, and is configured to change over a physical communication state or a physical isolation state between the interfaces and the interface control unit.

2. The imaging device having information protection function according to claim 1, further comprising a switch trigger unit, which is connected with the changeover switch unit, and configured to control changeover action of the changeover switch unit.

3. The imaging device having information protection function according to claim 2, wherein the changeover switch unit is a single-pole-multiple-throw switch or a semi-conductor switch circuit.

4. The imaging device having information protection function according to claim 3, wherein the switch trigger unit is a changeover button.

5. The imaging device having information protection function according to claim 2, wherein the switch trigger unit is a trigger circuit comprising a control input end and a control output end, the control input end is configured to input a control instruction signal, the control output end is connected with the changeover switch unit, the trigger circuit converts the control instruction signal into a control changeover signal and outputs the control changeover signal to the changeover switch unit through the control output end.

6. The imaging device having information protection function according to claim 5, wherein the trigger circuit further comprises a card read control unit, configured to read card information via the control input end; and
   wherein the trigger circuit generates a control changeover signal according to the card information and output the control changeover signal to the changeover switch unit through the control output end.

7. The imaging device having information protection function according to claim 5, further comprising a monitoring unit, which is connected between the switch trigger unit and each of the interfaces, the monitoring unit specifically comprising:
   a signal detecting subunit, configured to detect an input level signal and an output level signal at each interface;
   a changeover trigger subunit, configured to output the control instruction signal to the switch trigger unit according to the interface which has detected the input level signal, so as to trigger the changeover to physically communicate the interface which generates the level signal with the interface control unit.

8. The imaging device having information protection function according to claim 5, further comprising:
   a default interface changeover unit, which is connected with the switch trigger unit, and configured to output the control instruction signal to the switch trigger unit when a default reset condition is detected, so as to trigger the changeover to physically communicate a preset default interface with the interface control unit.

9. The imaging device having information protection function according to claim 2, further comprising:

a default interface changeover unit, which is connected with the switch trigger unit, and configured to output the control instruction signal to the switch trigger unit when a default reset condition is detected, so as to trigger the changeover to physically communicate a preset default interface with the interface control unit.

10. The imaging device having information protection function according to claim 9, wherein:
the default reset condition is a reboot signal or a sleep waking up signal; or
the monitoring unit of the imaging device further comprises a timekeeping subunit, configured to time the input level signal detected by the signal detecting subunit and produce the default reset condition when no input level signal is detected within a predetermined timing value range.

11. The imaging device having information protection function according to claim 2, wherein the interface is a serial communication bus interface.

12. The imaging device having information protection function according to claim 2, further comprising a monitoring unit, which is connected between the switch trigger unit and each of the interfaces, the monitoring unit specifically comprising:
a signal detecting subunit, configured to detect an input level signal and an output level signal at each interface;
a changeover trigger subunit, configured to output the control instruction signal to the switch trigger unit according to the interface which has detected the input level signal, so as to trigger the changeover to physically communicate the interface which generates the level signal with the interface control unit.

13. The imaging device having information protection function according to claim 12, wherein the monitoring unit further comprises:
a state informing subunit, configured to send a busy state notification or an idle state notification to each interface according to the output level signal detected at the interface.

14. The imaging device having information protection function according to claim 12, wherein the monitoring unit, the changeover switch unit, and/or the switch trigger unit are integrated in the imaging control unit, or provided independent of the imaging control unit.

15. The imaging device having information protection function according to claim 12, wherein the monitoring unit further comprises:
a priority control subunit, configured to select one interface according to a predetermined priority strategy and inform the changeover trigger subunit of the selected interface, when detecting that the input level signal is generated by at least two interfaces.

16. The imaging device having information protection function according to claim 12, further comprising:
an interface state indicating unit, configured to indicate a communication state of each interface according to the detected input level signal or output level signal of each interface.

17. The imaging device having information protection function according to claim 16, wherein the interface state indicating unit is a light emitting diode, the light emitting diode and/or its color corresponds to the communication state of each interface.

18. The imaging device having information protection function according to claim 12, further comprising:
a default interface changeover unit, which is connected with the switch trigger unit, and configured to output the control instruction signal to the switch trigger unit when a default reset condition is detected, so as to trigger the changeover to physically communicate a preset default interface with the interface control unit.

19. The imaging device having information protection function according to claim 18, wherein:
the default reset condition is a reboot signal or a sleep waking up signal; or
the monitoring unit of the imaging device further comprises a timekeeping subunit, configured to time the input level signal detected by the signal detecting subunit and produce the default reset condition when no input level signal is detected within a predetermined timing value range.

20. The imaging device having information protection function according to claim 16, wherein the interface state indicating unit is a display, configured to display the communication state of each interface.

\* \* \* \* \*